(12) United States Patent
Stoffels et al.

(10) Patent No.: US 6,817,656 B2
(45) Date of Patent: Nov. 16, 2004

(54) BODY OF A MOTOR VEHICLE

(75) Inventors: Oliver Stoffels, Ludwigsburg (DE);
Dieter Steinhauser, Remshalden (DE);
Thomas Meier, Rheinstetten (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/351,315

(22) Filed: Jan. 27, 2003

(65) Prior Publication Data

US 2003/0141746 A1 Jul. 31, 2003

(30) Foreign Application Priority Data

Jan. 26, 2002 (DE) .......................................... 102 02 957

(51) Int. Cl.$^7$ ................................................. B60J 7/00
(52) U.S. Cl. ........................... 296/203.02; 296/203.01; 296/203.03; 296/203.04
(58) Field of Search ....................... 296/203.02, 203.01, 296/203.03, 203.04, 193.01, 193.1, 187.09, 205; 180/264, 295; 280/781, 788, 786, 796

(56) References Cited

U.S. PATENT DOCUMENTS

| | | | |
|---|---|---|---|
| 3,188,132 A | * | 6/1965 | Schwiering et al. ... 296/203.02 |
| 4,216,839 A | | 8/1980 | Gould et al. |
| 4,425,979 A | * | 1/1984 | Young ........................ 180/264 |

(List continued on next page.)

FOREIGN PATENT DOCUMENTS

| | | |
|---|---|---|
| DE | 767115 | 10/1961 |
| DE | 3932196 C1 | 12/1990 |
| DE | 44 20 097 | * 10/1995 |
| EP | 0295661 | 6/1988 |
| EP | 0 295 661 | 6/1988 |
| EP | 0 295 661 | * 12/1988 |
| EP | 0372987 A2 | 6/1990 |
| EP | 0727343 | 8/1996 |
| EP | 0727343 A1 | 8/1998 |
| FR | 940.982 | 12/1948 |
| FR | 2687352 | 8/1993 |
| FR | 2687362 A1 | 8/1993 |
| GB | 2 153 751 | * 8/1985 |
| GB | 2317858 | 4/1998 |
| GB | 2317868 A | 4/1998 |
| JP | 58 180383 | * 10/1983 |
| JP | 2 200580 | * 8/1990 |
| JP | 4 11580 | * 1/1992 |

OTHER PUBLICATIONS

European Search Report Mailed Jan. 12, 2004.

P. 138 of It Zeitschrift Quattroroute 45 (2000) 531, Jan.

*Primary Examiner*—Kiran Patel
(74) *Attorney, Agent, or Firm*—Crowell & Moring LLP

(57) ABSTRACT

A body suitable for motor vehicles, especially for passenger cars, comprises a passenger compartment with at least one supporting structure connected thereto, for example, for accommodating a driving unit and wheel guiding elements, the supporting structure being connected by a holder with the passenger compartment. To optimize this body, the supporting structure, having a connecting region to the passenger compartment, and a rear end region, is formed by an enveloping device of high strength, especially of fiberglass-reinforced plastic, the strength of which is optimized, the enveloping device surrounding the driving unit substantially all around.

17 Claims, 5 Drawing Sheets

U.S. PATENT DOCUMENTS

| | | | | |
|---|---|---|---|---|
| 4,542,934 A | * | 9/1985 | Komatsu et al. | 296/203.02 |
| 4,601,510 A | * | 7/1986 | Schoppel et al. | 296/203.02 |
| 4,790,588 A | * | 12/1988 | Corson | 296/203.02 |
| 4,811,812 A | * | 3/1989 | Cassese | 180/295 |
| 4,869,539 A | * | 9/1989 | Cassese | 280/781 |
| 4,900,083 A | * | 2/1990 | Kumasaka et al. | 296/203.02 |
| 4,919,474 A | * | 4/1990 | Adachi et al. | 296/203.02 |
| 4,950,026 A | * | 8/1990 | Emmons | 296/203.01 |
| 5,106,148 A | * | 4/1992 | Ikeda et al. | 296/203.02 |
| 5,280,957 A | * | 1/1994 | Hentschel et al. | 280/788 |
| 5,352,011 A | * | 10/1994 | Kihara et al. | 296/203.03 |
| 5,704,644 A | * | 1/1998 | Jaggi | 280/796 |
| 5,806,919 A | * | 9/1998 | Davies | 296/203.01 |
| 5,855,407 A | * | 1/1999 | Fukuda | 296/203.03 |
| 5,954,364 A | * | 9/1999 | Nechushtan | 296/203.01 |
| 6,015,022 A | * | 1/2000 | Thuliez | 280/786 |
| 6,092,865 A | * | 7/2000 | Jaekel et al. | 296/203.04 |
| 6,099,039 A | * | 8/2000 | Hine | 296/193.01 |
| 6,170,906 B1 | * | 1/2001 | Kasuga | 296/203.02 |
| 6,250,710 B1 | * | 6/2001 | Matsuzaki | 296/203.02 |
| 6,293,617 B1 | * | 9/2001 | Sukegawa | 296/203.02 |
| 6,382,709 B1 | * | 5/2002 | Chirifu et al. | 296/193.1 |
| 6,398,292 B2 | * | 6/2002 | Tsuruta et al. | 296/187.09 |
| 6,409,255 B2 | * | 6/2002 | Tilsner et al. | 296/203.02 |
| 6,412,857 B2 | * | 7/2002 | Jaekel et al. | 296/203.04 |
| 6,416,119 B1 | * | 7/2002 | Gericke et al. | 296/205 |
| 6,533,348 B1 | * | 3/2003 | Jaekel et al. | 296/203.04 |
| 2002/0093221 A1 | * | 7/2002 | Forssell et al. | 296/203.02 |

* cited by examiner

BODY OF A MOTOR VEHICLE

BACKGROUND AND SUMMARY OF THE INVENTION

This application claims the priority of German Patent Document 102 02 957.1, filed on Jan. 26, 2002, the disclosure of which is expressly incorporated by reference herein.

This invention relates to a body of a motor vehicle, particularly of a passenger car, comprising a passenger compartment and at least one supporting structure adjoining thereon for accommodating a driving unit, the supporting structure being connected to the passenger compartment by way of holding elements.

A well-known passenger car, disclosed in the publication IT Zeitschrift Quattroroute 45 (2000) 531, January, page 138, which is a high performance car, has a body with a two-seater passenger compartment. The structure of the passenger compartment consists of high-strength plastic and is interlocked with a driving unit directly, that is, without the interpositioning of a supporting structure. The driving unit, consisting of an internal combustion engine, clutch and transmission, is installed between the wheel axles; however, it is adjacent to a rear axle centrally placed engine arrangement in the passenger car.

European Patent Document EP 295 661 A2 and corresponding to U.S. Pat. No. 4,811,812 disclose a rear supporting structure of a body, which is connected with a passenger compartment through the agency of flexible elements. The above-mentioned supporting structure is formed by a tubular frame construction, comprising upper and lower frame side members and cross members and supporting members extending between the latter. In addition, provisions are made on the tubular frame construction to accommodate the driving unit and wheel suspension elements.

French Patent Document FR 940 982 discloses a body with a passenger compartment, which is bounded by a front and a rear supporting structure. Both supporting structures are formed by metallic lattice frames, one supporting structure accommodating a driving unit. Bearing eye-like extensions, which are embraced by bearing forks, mounted on the tubular supports of the supporting structure, lead away from the passenger compartment. The supporting structures are fastened to the passenger compartment with holding means.

It is an aspect of the invention to create a supporting structure, which is distinguished by a low weight as well as by a high strength, for a body of a motor vehicle. Moreover, the supporting device should take up the driving unit in a justifiable amount of space and be integrated in an advantageous manner in a body of a motor vehicle.

Pursuant to the invention, this aspect can be accomplished in that the supporting structure, having a connecting region to the passenger compartment and a rear end region, is formed by a strength-optimized enveloping device of high strength, the enveloping device substantially surrounding a housing of a driving unit. Further distinguishing features, developing the invention, are contained below and in other embodiments.

A principal advantage, achieved with certain preferred embodiments of the invention, is to be seen therein that the enveloping device has a high strength, which also stiffens the body and reliably absorbs the static and dynamic stresses that occur. Moreover, the enveloping device surrounds the driving unit, comprising the internal combustion: engine, the clutch and the transmission, in a space-saving and accessible manner. The partially visible driving unit and the course of the cross members and the frame side member, as well as the design of the passage openings, produce a special aesthetic effect. Moreover, it is possible to integrate sockets for bearings of the driving unit in the enveloping device, the driving unit being assembled with the enveloping device into a pre-assembled structural unit. This contributes to the simplification of the assembly. Finally, the enveloping device can be produced easily owing to the fact that it consists of an upper part and a lower apart, which are connected with one another by bolts.

Other objects, advantages and novel features of the present invention will become apparent from the following detailed description of the invention when considered in conjunction with the accompanying drawings.

DETAILED DESCRIPTION OF THE DRAWINGS

Figure 1:
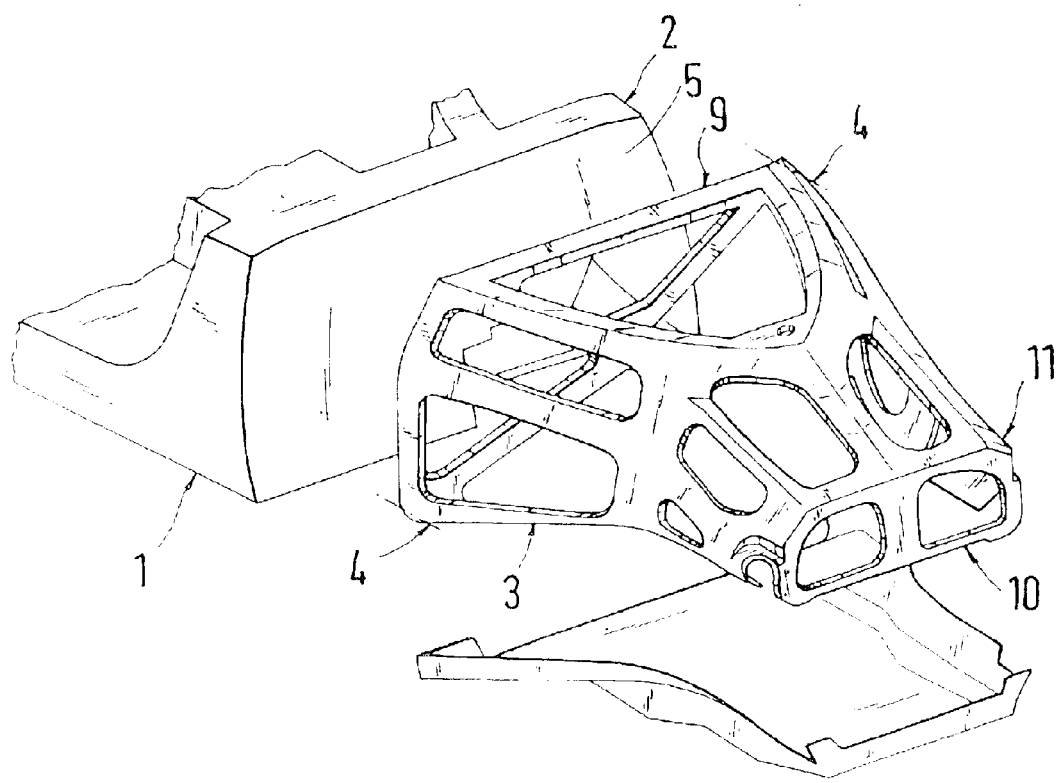
FIG. 1 shows a slanting view of a diagrammatically represented body of a motor vehicle with a passenger compartment and a supporting structure.
Figure 2:
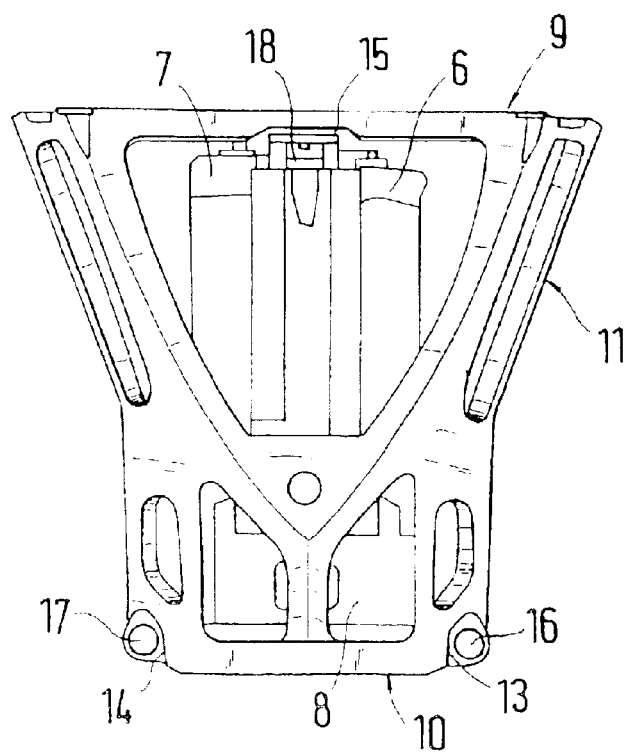
FIG. 2 shows a view from above of the supporting structure of FIG. 1 with a driving unit indicated therein.

Only the body 1, which comprises a passenger compartment 2, consisting, for example, of a high-strength plastic, and a supporting structure, is shown of a high performance motor vehicle or a passenger car. Through the agency of holding elements constructed, for example, as bolts 4, the supporting structure 3 is connected to a rear transverse wall 5 and serves to accommodate a driving unit 6 and wheel suspension elements, as shown in FIG. 1. The driving unit 6, as shown in FIG. 2, is formed by an internal combustion engine 7, a clutch and a transmission 8, which are interlocked with one another, the internal combustion engine 7 extending between wheel axles of the motor vehicle, however adjacent to a rear axle centrally placed engine arrangement.

As seen in the longitudinal direction of the vehicle, the supporting structure 3 extends between a connecting region 9, disposed adjacent to the passenger compartment 2, and a rear end region 10, facing the rear of the vehicle, and is constructed as a tubular enveloping device 11 with an interior space 12, in which the driving unit 6 is disposed. The enveloping device surrounds at least a portion of the housing of the driving unit 6. Moreover, the enveloping device 11 is produced from a high-strength plastic, especially a fiberglass reinforced plastic.

The enveloping device 11 has at least first, second and third sockets 13, 14 and 15 for bearings 16, 17, 18 of the driving unit 6, the sockets 13, 14 and 15 being integrated in the enveloping device. Moreover, the possibility exists that the enveloping device 11 and the driving unit represent a pre-assembled structural unit, which is connected with the passenger compartment 2 during the production of the motor vehicle.

In order to optimize the strength of the enveloping device 11, the latter has a supporting device 19, which, in the connecting region 9, has a first, profiled transverse member 20 and, in the end region, a second, profiled transverse member 21, between which there are several profiled frame side members 22, 23, 24, 25, 26, 27 and 28. An advantageous arrangement of these frame side members is achieved, if at least a further transverse member 29 is provided at least between a portion of these.

Figure 3:
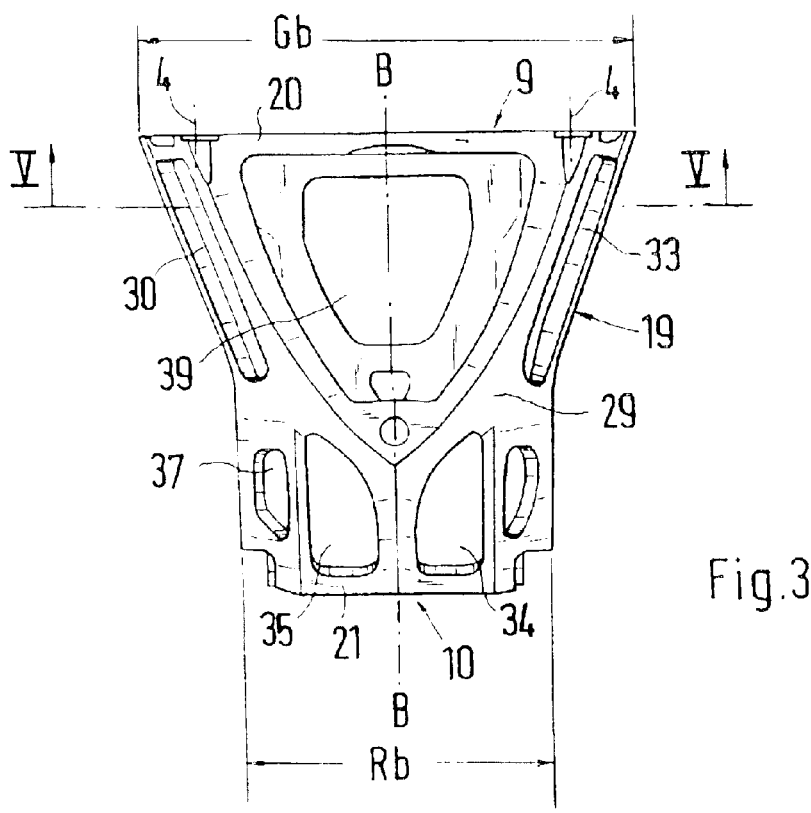
FIG. 3 shows a view, corresponding to that of FIG. 2, however, without the driving unit.

It can be seen from FIG. 3 that, when the motor vehicle is viewed from above, the enveloping device 11 tapers between the connecting region 9 and the rear end region 10 from a first total width Gb to a second, reduced width Rb. Moreover, the second, reduced width Rb commences approximately in a central section between the connecting region 9 and the end region 10 of the enveloping device 11, which is constructed symmetrically to a central medium plane B—B of the vehicle. Moreover, where the transverse member 29, which reinforces the enveloping device 11, extends further; the reduced width Rb remains approximately constant up to the rear end region 10.

The passage openings 30, 31, 32, 33, 34, 35, 36, 37, 38 and 39, over which the driving unit 6 is accessible, are bounded by the transverse members 20, 21 and 29 as well as by the frame side members 22, 23, 24, 25, 26, 27 and 28. If formed appropriately, these members and the passage openings contribute to the aesthetically particularly pleasing effect achieved by the enveloping device 11. The course and a dimensioning of the members are determined, on the one hand, by the dimensions of the driving unit 6 and, on the other, by the static and dynamic loads, which act on the enveloping device 11, the use of iterative and computational measures being suitable for designing their shape.

Figure 6:
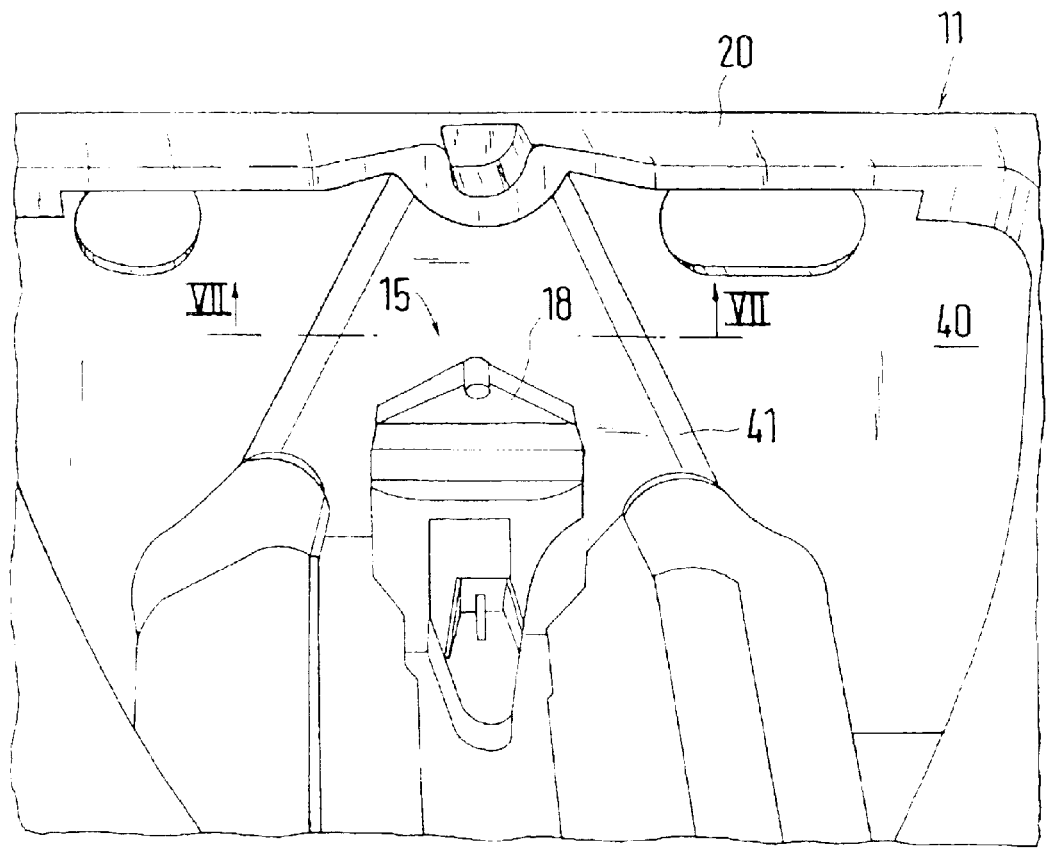
FIG. 6 shows a view, slanting from above of a closing wall of the supporting structure.
Figure 7:
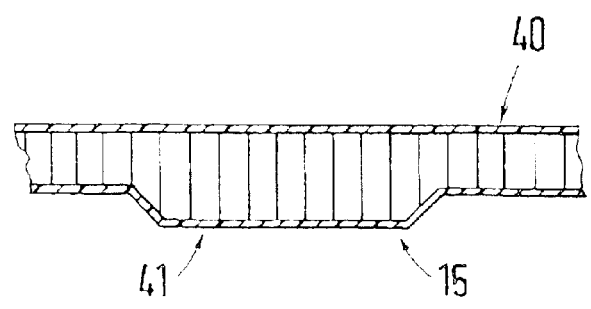
FIG. 7 shows a section along the line VII—VII of FIG. 6.
Figure 8:
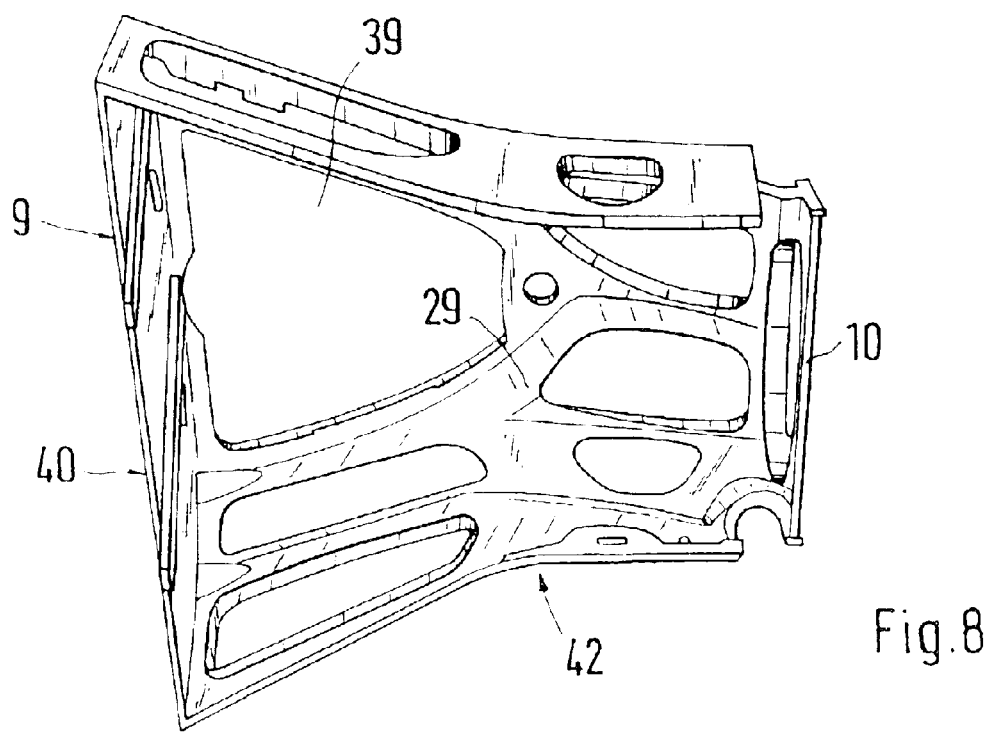
FIG. 8 shows a slanting view from below of an upper part of the supporting structure.
Figure 9:
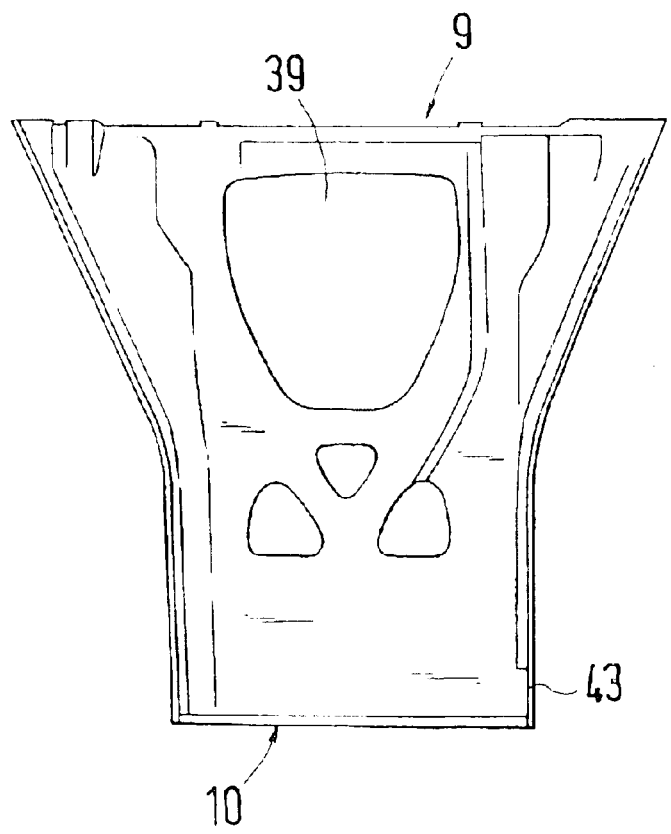
FIG. 9 shows a view from above of the lower apart of the supporting structure.

In the connecting region 9, the enveloping device 11 has a closing wall 40, which extends substantially over the whole height Hg and the whole width Gb of said enveloping device and is integrated, for example, as a carbon fiber-reinforced plastic part in the latter. The closing wall 40, as shown in FIG. 6, is provided with a local cross-sectional expansion 41, which forms the socket 15 for the bearing 18 of the driving unit 6. The cross-sectional expansion 41 is a thickening, formed in the direction of the driving unit 6, as shown in FIG. 7, and extends over the whole height Hg of the closing wall 40 and has the shape of an inverted V.

Figure 5:
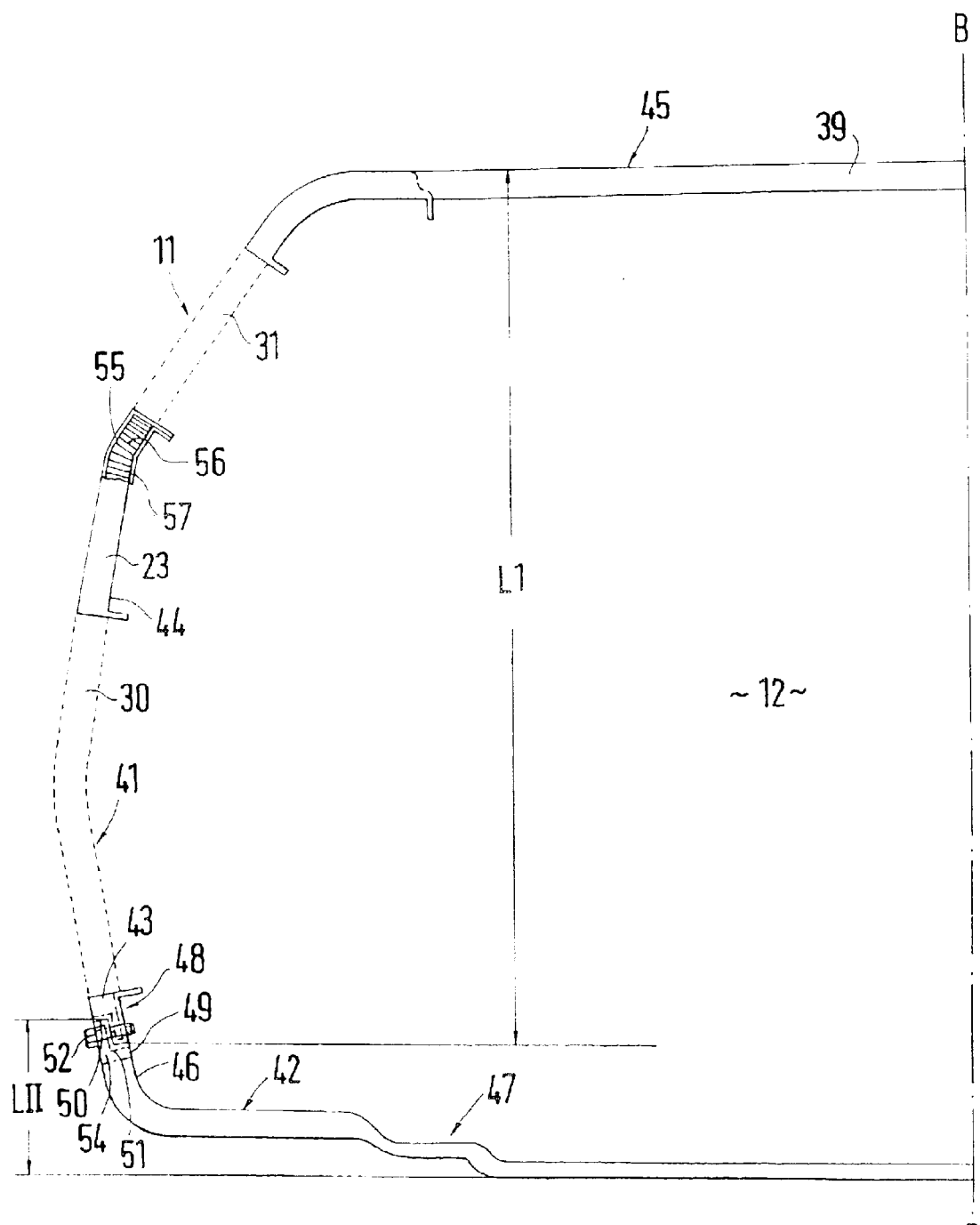
FIG. 5 shows a section along the line V—V of FIG. 3.

The enveloping device 11 is formed by an upper part 42 and a lower part 43, as shown in FIG. 5. Moreover, the upper part has lateral, upright, enveloping sections 44 and a horizontally aligned enveloping section 45. The lower part 43 has upright enveloping sections 46 and a horizontal enveloping section 47. The length LI of the enveloping sections 44 of the upper part 42 is greater than the length LII of the enveloping sections 46 of the lower part 43 and first and second free ends 48 and 49, facing one another, interact with each other. For this purpose, the free ends 48 and 49 are provided with steps 50 and 51. These ends are assembled in such a manner that stepped connections result. In the region of the stepped connections, the upper part 42 and the lower part 43 are connected together by way of bolts 52, and the steps 50 and 51 are provided with metallic inserts 53 and 54, which are introduced in the enveloping sections 44 and 46. The longitudinal member 23, which reproduces the basic construction essentially of all members of the supporting device 19, is integrated in the upper part 42 and in the enveloping sections 44. Accordingly, in cross-section, this frameside member 23 comprises a carbon fiber-reinforced outer shell 55, a honeycomb structure 56 and an inner shell 57, which are assembled into a structure of high strength and processed.

Figure 4:
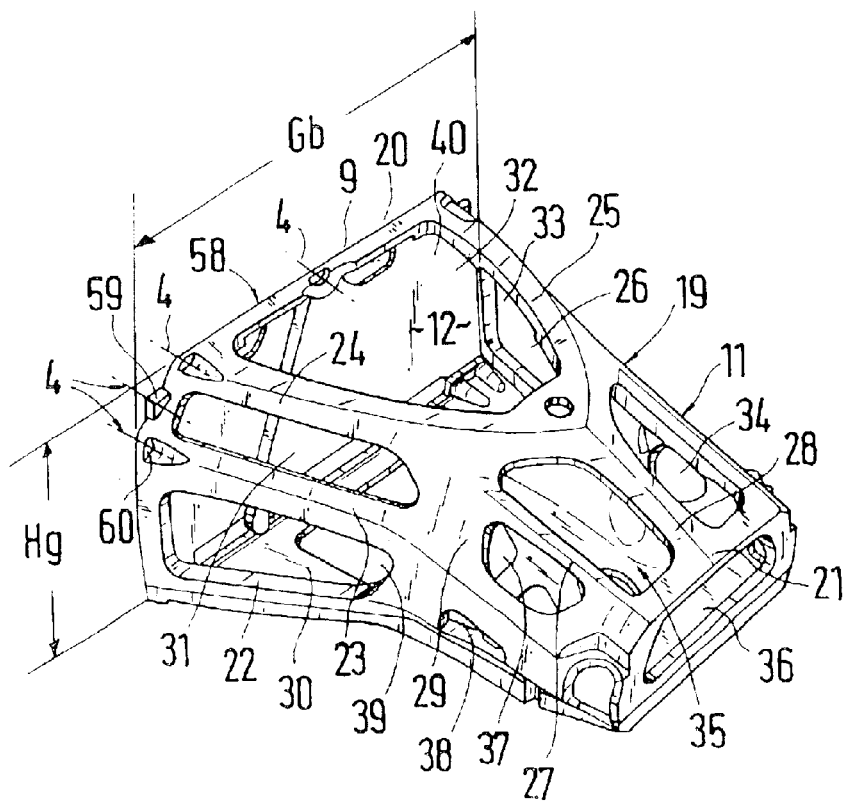
FIG. 4 shows a slanting view of the supporting structure from the left rear and from above.

The enveloping device 11 is held with the bolts 4 at the passenger compartment 2, as shown in FIG. 4. For this purpose, first corbel-like brackets 59 and second corbel-like brackets 60 are provided along an outer periphery 58 of the transverse member 20. The brackets 59 are formed by local expansions, and the brackets 60 are formed by moldings in the transverse member 20.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A body for a motor vehicle comprising a passenger compartment, comprising at least one supporting structure adjoining the passenger compartment for accommodating at least a driving unit and being rigidly connected to the passenger compartment by holding elements, wherein the supporting structure is formed by a strength-optimized enveloping device substantially surrounding the housing of the driving unit to form a pre-assembled structural unit with the driving unit and constitute a peripherally self-rigid unit as viewed transversely to a longitudinal direction of the motor vehicle.

2. The body according to claim 1, wherein the enveloping device has at least first, second and third sockets for bearings of the driving unit.

3. The body according to claim 2, wherein the sockets are integrated in the enveloping device.

4. The body according to claim 1, wherein the enveloping device adjacent to a region adjoining the passenger compartment comprises a first profiled transverse member and, adjacent a rear end region of the enveloping device, a second, profiled transverse member, between which several profiled frame side members extend.

5. The body according to claim 4, wherein a further, central transverse member is provided between at least one part of the frame side members.

6. The body according to claim 4, wherein the transverse members and the frame side members form a closed boundary defining a plurality of passage openings configured to provide access to the driving unit.

7. The body according to claim 5, wherein the transverse members and the framed side member form a closed boundary defining a plurality of passage openings configured to provide access to the driving unit.

8. The body according to claim 1, wherein, adjacent to a region adjacent the passenger compartment, the enveloping device has an integrated closing wall.

9. The body according to claim 8, wherein the closing wall is provided with a local cross-sectional thickening.

10. The body according to claim 9, wherein the cross-sectional thickening extends over a substantial portion of a height of the closing wall and has a shape of an inverted V.

11. The body according to claim 1, wherein the enveloping device is formed by an upper part and a lower part.

12. The body according to claim 11, wherein the upper part has lateral enveloping sections and an upper, horizontal, enveloping section, and wherein first free ends of the upper part interact with free ends of the lower part.

13. The body according to claim 12, wherein the first free ends and the second free ends are provided with steps which form stepped connections.

14. The body according to claim 13, wherein the upper part and the lower part of the enveloping device are connected with one another by bolts in a region of the stepped connections.

15. The body according to claim 1, wherein the supporting structure accommodates wheel-guiding elements.

16. The body according to claim 1, wherein the enveloping device is made of fiberglass-reinforced plastic.

17. A supporting structure of a motor vehicle, comprising:

a high strength, strength-optimized enveloping frame defining closed boundaries in a longitudinal and transverse direction of the motor vehicle that are configured to provide passage to a driving unit, a connecting region operable to connect rigidly to a passenger compartment by holding elements, and a rear end region arranged opposite the connecting region, wherein the enveloping frame substantially surrounds and is pre-assembled with the driving unit.

\* \* \* \* \*